(12) United States Patent
Chen et al.

(10) Patent No.: US 7,624,054 B2
(45) Date of Patent: Nov. 24, 2009

(54) FINANCIAL RISK MITIGATION OPTIMIZATION SYSTEMS AND METHODS

(75) Inventors: Wei Chen, Apex, NC (US); Donald J. Erdman, Raleigh, NC (US); Ping Hu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 542 days.

(21) Appl. No.: 11/211,353

(22) Filed: Aug. 25, 2005

(65) Prior Publication Data

US 2007/0050282 A1 Mar. 1, 2007

(51) Int. Cl.
*G06Q 40/00* (2006.01)
(52) U.S. Cl. .................. 705/35; 705/36 R; 705/37
(58) Field of Classification Search .................. 705/35, 705/36 R, 37
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist et al. | |
| 5,790,847 A | 8/1998 | Fisk et al. | |
| 5,799,286 A | 8/1998 | Morgan et al. | |
| 5,963,910 A | 10/1999 | Ulwick | |
| 5,970,476 A | 10/1999 | Fahey | |
| 6,009,407 A | 12/1999 | Garg | |
| 6,014,640 A | 1/2000 | Bent | |
| 6,029,139 A | 2/2000 | Cunningham et al. | |
| 6,078,892 A | 6/2000 | Anderson et al. | |
| 6,115,691 A | 9/2000 | Ulwick | |
| 6,236,977 B1 | 5/2001 | Verba et al. | |
| 6,237,138 B1 | 5/2001 | Hameluck et al. | |
| 6,275,812 B1 | 8/2001 | Haq et al. | |
| 6,286,005 B1 | 9/2001 | Cannon | |
| 6,321,206 B1 | 11/2001 | Honarvar | |
| 6,330,552 B1 | 12/2001 | Farrar et al. | |
| 6,490,569 B1 | 12/2002 | Grune et al. | |
| 6,502,077 B1 | 12/2002 | Speicher | |
| 6,526,526 B1 | 2/2003 | Dong et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,735,570 B1 | 5/2004 | Lacy et al. | |
| 6,901,406 B2 | 5/2005 | Nabe et al. | |

(Continued)

FOREIGN PATENT DOCUMENTS

WO 0111522 2/2001

OTHER PUBLICATIONS

Saunders, A. and M.M. Cornett, Financial Institutions Management: A Risk Management Approach. (New York: McGraw HIll, 2003) fourth edition [ISBN 0072486198; 0071198873 (international edition)] Chapters 11 and 27.*

(Continued)

*Primary Examiner*—Jagdish N Patel
*Assistant Examiner*—Sara Chandler
(74) *Attorney, Agent, or Firm*—Jones Day

(57) ABSTRACT

Systems and methods for optimizing financial risk mitigations. A system and method can be provided for the generation of a financial risk mitigation optimization model. The model can be used in determining an allocation of financial risk mitigations with respect to exposures.

19 Claims, 7 Drawing Sheets

U.S. PATENT DOCUMENTS

| | | | |
|---|---|---|---|
| 6,907,382 | B2 | 6/2005 | Urokohara |
| 6,970,830 | B1 | 11/2005 | Samra et al. |
| 7,003,470 | B1 | 2/2006 | Baker et al. |
| 7,177,850 | B2 | 2/2007 | Argenton et al. |
| 7,308,414 | B2 | 12/2007 | Parker et al. |
| 7,376,647 | B1 | 5/2008 | Guyan et al. |
| 2001/0014868 | A1 | 8/2001 | Herz et al. |
| 2002/0013757 | A1 | 1/2002 | Bykowsky et al. |
| 2002/0046096 | A1 | 4/2002 | Srinivasan et al. |
| 2002/0072953 | A1 | 6/2002 | Michlowitz et al. |
| 2002/0107723 | A1 | 8/2002 | Benjamin et al. |
| 2002/0116237 | A1 | 8/2002 | Cohen et al. |
| 2002/0123930 | A1 | 9/2002 | Boyd et al. |
| 2002/0123945 | A1 | 9/2002 | Booth et al. |
| 2002/0169654 | A1 | 11/2002 | Santos et al. |
| 2002/0169655 | A1 | 11/2002 | Beyer et al. |
| 2002/0178049 | A1 | 11/2002 | Bye |
| 2003/0023598 | A1 | 1/2003 | Janakiraman et al. |
| 2003/0078830 | A1 | 4/2003 | Wagner et al. |
| 2003/0083924 | A1 | 5/2003 | Lee et al. |
| 2003/0083925 | A1 | 5/2003 | Weaver et al. |
| 2003/0088458 | A1 | 5/2003 | Afeyan et al. |
| 2003/0097292 | A1 | 5/2003 | Chen et al. |
| 2003/0110072 | A1 | 6/2003 | Delurgio et al. |
| 2003/0110080 | A1 | 6/2003 | Tsutani et al. |
| 2003/0120584 | A1 | 6/2003 | Zarefoss et al. |
| 2003/0126010 | A1 | 7/2003 | Barns-Slavin |
| 2003/0149613 | A1 | 8/2003 | Cohen et al. |
| 2003/0208402 | A1 | 11/2003 | Bibelnieks et al. |
| 2003/0208420 | A1 | 11/2003 | Kansal |
| 2003/0236721 | A1 | 12/2003 | Plumer et al. |
| 2004/0073496 | A1 | 4/2004 | Cohen |
| 2004/0199445 | A1* | 10/2004 | Eder .......................... 705/35 |
| 2004/0215551 | A1* | 10/2004 | Eder .......................... 705/38 |
| 2005/0278262 | A1* | 12/2005 | Cheliotis et al. ............ 705/400 |
| 2006/0143042 | A1 | 6/2006 | Gragg et al. |
| 2006/0253403 | A1 | 11/2006 | Stacklin et al. |
| 2007/0226090 | A1 | 9/2007 | Stratton |
| 2008/0065435 | A1 | 3/2008 | Ratzloff |

OTHER PUBLICATIONS

Stratton, Alan J., U.S. Appl. No. 11/370,371, filed Mar. 8, 2006 entitled "Systems And Methods For Costing Reciprocal Relationships".

Cokins, Gary et al., "An ABC Manager's Primer Straight Talk on Activity-Based Costing", Institute of Management Accountants, Mar. 9, 1993, pp. 1-40, 63-64.

Data Mining News, Looking Past Automation, MarketSwitch Focuses on Optimization of Marketing Campaigns, Data Mining News, May 10, 1999 [Google].

Porter-Kuchay, Multidimensional Marketing, Target Marketing, Jan. 2000 [Dialog: file 13].

Spiegelman, Optimizers Assist in Specialized Marketing Efforts, Computer Reseller News, Nov. 22, 1999 [Proquest].

Balintfy et al., Binary and Chain Comparisons with an Experimental Linear Programming Food Price Index, The Review of Economics and Statistics, vol. 52, No. 3, Aug. 1970, pp. 324-330 [JSTOR].

Manchanda et al., The "Shopping Basket": A Model for Multi-category Purchase Incidence Decisions, Marketing Science, vol. 18, No. 2, 1999, pp. 95-114 [JSTOR].

Saarenvirta, "Data Mining to Improve Profitability", CMA Magazine, vol. 72, No. 2, Mar. 1998, pp. 8-12 [Dialog: file 15].

Johnson et al., "Recent Developments and Future Directions in Mathematical Programming", IBM Systems Journal, vol. 31, No. 1, 1992, pp. 79-93 [Dialog: file 15].

Model1 by Group 1 Software, www.g1.com, Aug. 29, 1999 [retrieved Dec. 21, 2005], pp. 1-16, retrieved from: Google.com and archive.org.

SAS Institute Inc., Data Mining, www.sas.com, Jan. 29, 1998 [retrieved Dec. 22, 2005], pp. 1-28, retrieved from: Google.com and archive.org.

Hollander, Geoffrey, "Model1 deftly parses customer characteristics", InfoWorld, May 25, 1998, vol. 20, No. 21, pp. 1-4, retrieved from: Dialog, file 148.

"Unica Releases Model 1 Enterprise Edition", Business Wire, Oct. 29, 1998 [retrieved Dec. 22, 2005, pp. 1-3, retrieved from: Proquest Direct.

Rosen, Michele, "There's Gold in That There Data", Insurance & Technology, Dec. 1998, vol. 23, No. 12, pp. 1-6, retrieved from: Dialog, file 16.

Horngren, Charles T. et al., "Cost Accounting A Managerial Emphasis", Tenth Edition, Chapter 14, pp. 497-534, 2000.

Kearney, Trevor D., "Advances in Mathematical Programming and Optimization in the SAS System," SUGI Proceedings, 1999 (12 pp.).

Cohen, Marc-david, et al., "SAS/OR® Optimization Procedures, with Applications to the Oil Industry," SUGI Proceedings, 1994 (pp. 1-9).

Beamon, Benita M., "Supply chain design and analysis: Models and methods", International Journal of Production Economics, Apr. 15, 1998, pp. 281-294.

Lee, Eon-Kyung, et al., "An effective supplier development methodology for enhancing supply chain performance," ICMIT 2000, pp. 815-820.

"Perfect and Open Ratings Form Alliance to Provide Critical Supplier Performance Ratings to Private Exchanges and Net Markets", Business Wire, Oct. 30, 2000 (3 pp.).

"I2 Technologies: i2 releases i2 Five.Two—The complete platform for dynamic value chain management; Flexible, intuitive, powerful solutions designed to help companies gain efficiencies and drive revenue", M2 Presswire, Oct. 25, 2001 (4 pp.).

Medaglia, Andres L., "Simulation Optimization Using Soft Computing", dissertation for Operations Research Department at North Carolina State University, Jan. 24, 2001 (2 pp.).

Lee, Eon-Kyung, et al., "Supplier Selection and Management System Considering Relationships in Supply Chain Management", IEEE Transactions on Engineering Management, vol. 48, No. 3, Aug. 2001, pp. 307-318.

Samudhram, Ananda, "Solver setting for optimal solutions", New Strait Times, Nov. 22, 1999 (3 pp.).

Cook, Wade D., et al., "Evaluating Suppliers of Complex Systems: A Multiple Criteria Approach", The Journal of the Operational Research Society, vol. 43, No. 11, Nov. 1992, (pp. 1055-1061.

* cited by examiner

FINANCIAL RISK MITIGATION OPTIMIZATION SYSTEMS AND METHODS

BACKGROUND

The present disclosure is generally directed to computer-implemented risk analysis, and more specifically to computer-implemented optimization of financial risk mitigation.

Banks and other types of financial institutions must deal with many exposure issues, such as complicated loan issues. Often exposures are secured by different forms of security, which can be considered a type of financial risk mitigation. Regulations often require that financial institutions have capital on hand to account for any unsecured portion and secured portions of exposures, where the capital charge for a secured portion is based on the riskiness of the mitigation, as well as any discounts that may be applied to the mitigation when the mitigation is used to secure the exposure. Moreover, these same regulations can require that financial institutions have capital on hand to account for a portion of the financial risk mitigations, based on the riskiness of the mitigation, as well as any discounts that may be applied to the mitigations. One example of such a regulation is Basel II. While it may specify risk weightings for mitigations and unsecured exposures according to their respective financial qualities, Basel II does not specify any effective mechanism for addressing complicated mitigation and exposure issues.

SUMMARY

Financial risk mitigation approaches can use tools to relieve losses due to default events. Published financial regulations outline financial risk mitigations that financial institutions may use in the regulatory capital charge calculations, for example. A financial institution's opportunity cost can be directly related to how much regulatory capital it must set aside for each loan it provides. If a bank properly allocates its financial risk mitigations to cover its exposures according to the contractual exposure-mitigation relationships, it can set aside lower regulatory capital for compliance with regulation. This disclosure describes how financial risk management can apply network optimization systems and methods to analyze exposure coverage.

As an example of a system and method to analyze exposure coverage, financial risk mitigation optimization models can be generated based upon exposure data, mitigation data, and data about relationship(s) between the exposures and mitigations. The financial risk mitigation optimization model is then used to determine a proper allocation of mitigations with respect to exposures.

DETAILED DESCRIPTION

Figure 1:
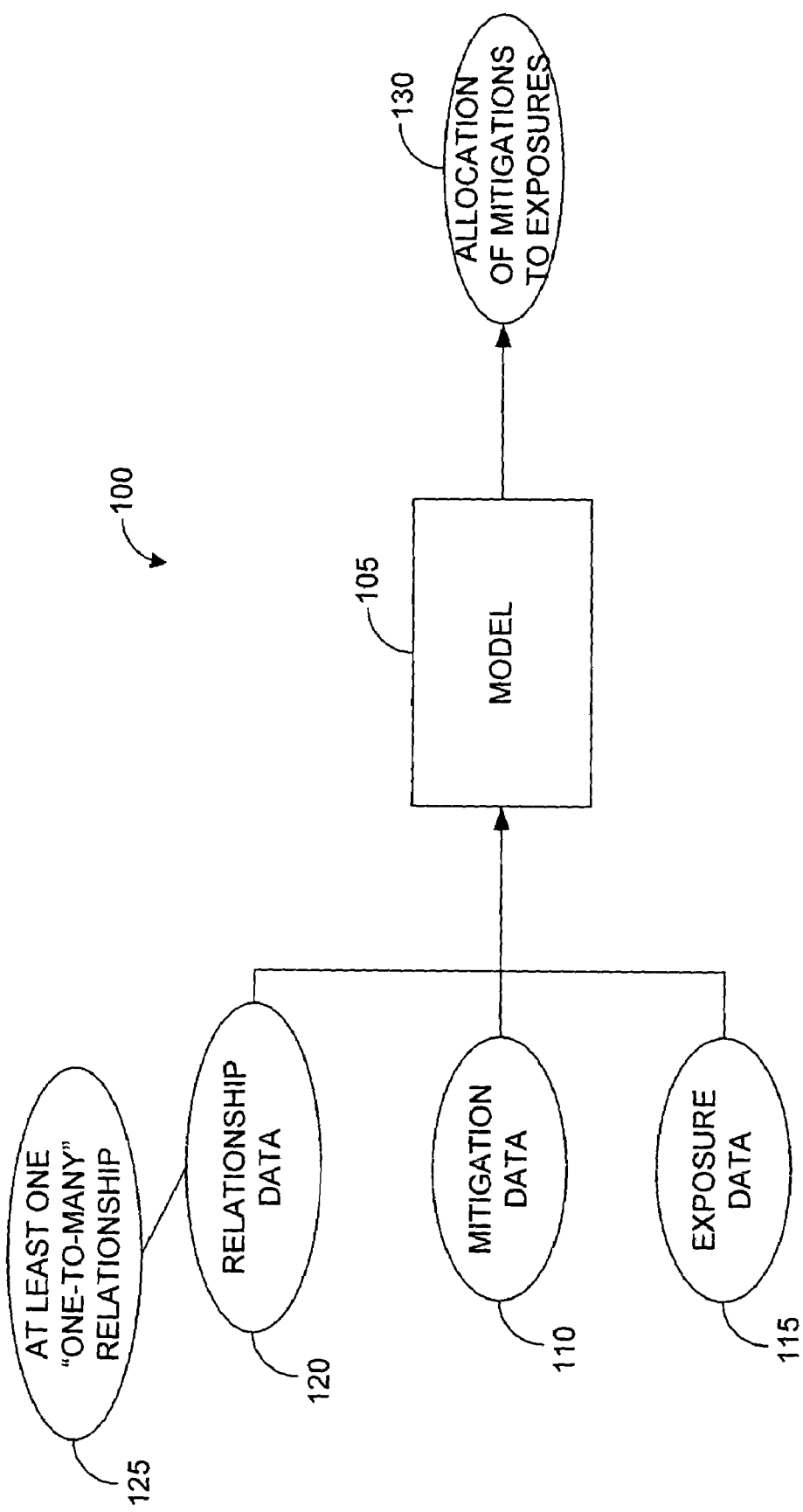
FIGS. 1-3 are block diagrams depicting examples of financial risk mitigation optimization systems.

FIG. 1 depicts a computer-implemented financial risk optimization system 100. The financial risk mitigation system 100 can include a model 105 that optimizes general supply and demand networks in order to determine an allocation of financial risk mitigations to exposures. The model 105 can accomplish this based upon such inputs as financial risk mitigation data 110, exposure data 115, and relationship data 120.

The mitigation data 110 can represent any number of financial risk mitigations, including, but not limited to, collateral, insurance, credit derivatives, guarantees, netting agreements, and other types of credit risk mitigations.

The exposure data 115 can represent loans made by a financial institution. However, it should be understood that there are many other types of financial exposures that can be addressed. For example, a guarantee can be an exposure for a guarantor.

The relationship data 120 includes information about one or more "one-to-many" relationships 125 between an exposure and a financial risk mitigation. It should be understood that the "one-to-many" relationship 125 can also include a "many-to-many" relationship. As an illustration, when an exposure is carried by a financial institution, the exposure is often secured by a mitigation. In some instances an exposure can be secured by several mitigations. In other instances, a single mitigation can secure several exposures. In the example of a loan with collateral, the security is provided by an agreement between the lender and the borrower that gives the lender rights in the collateral upon default on the loan by the borrower. Thus, the exposure is related to the mitigation by an agreement. It should be understood that not all mitigations may be connected to all exposures. As another illustration, if an exposure is related to a first mitigation and a second mitigation, there are two ways to apply the mitigations to the exposure. One way to apply the mitigations to the exposure is to apply the first exposure first, and the second exposure second. Another way to apply the mitigations to the exposure is to apply the second mitigation first, and the first mitigation second. Moreover, it should be noted that depending on the sequence in which the mitigations are applied to the exposures, different results can be obtained because of the cost and risk weights that can be associated with applying a mitigation to an exposure. The model 105 can be constructed to address the sequencing issue associated with a "one-to-many" type situation in an optimum manner, so as to reduce regulatory capital, thereby decreasing the opportunity cost experienced by a user of the system.

The mitigation data 110, the exposure data 115, and the relationship data 120 are used to create a generalized network model represented by the data. The network model can be solved using linear programming algorithms. Linear programming algorithms include, for example, a simplex algorithm, and an interior point algorithm, among others. It should be recognized however, that these two algorithms may be combined in some instances, and can also include extensions for network optimization. It should therefore also be understood that this disclosure is not intended to be limited to any particular linear programming algorithm. Any algorithm that solves a generalized network model can be used in conjunction with this disclosure.

In this example, after operation of the linear programming algorithm, the model 105 produces an allocation 130 of mitigations to exposures. The allocation 130 is the solution to the generalized network model as computed by linear programming algorithm(s) used by the model 105. The allocation 130 can provide a user, such as for example a financial institution, with a record of what level of assets should be set aside to account for the unmitigated exposures and the financial risk mitigations. It should be understood that international banking standards and regulations in some instances can require regulatory capital to account for the inherent riskiness of financial risk mitigations themselves, as well as unsecured exposures based on the riskiness of the unsecured exposure.

In the example shown in FIG. 1, the model 105 can analyze the mitigation data 110, the exposure data 115 and the relationship data 120 in order to provide a proper riskiness measure and/or discount(s) to the exposures and mitigations, as well as providing the cost and/or discount associated with a relationship between a mitigation and an exposure. As an illustration the model 105 can accept the exposure-mitigation data 110, 115, 120 and provide an allocation of the data based on calculated riskiness measures derived according to the types of mitigations and exposures, as well as discounts and costs associated with the relationships between the mitigations and exposures.

Figure 2:
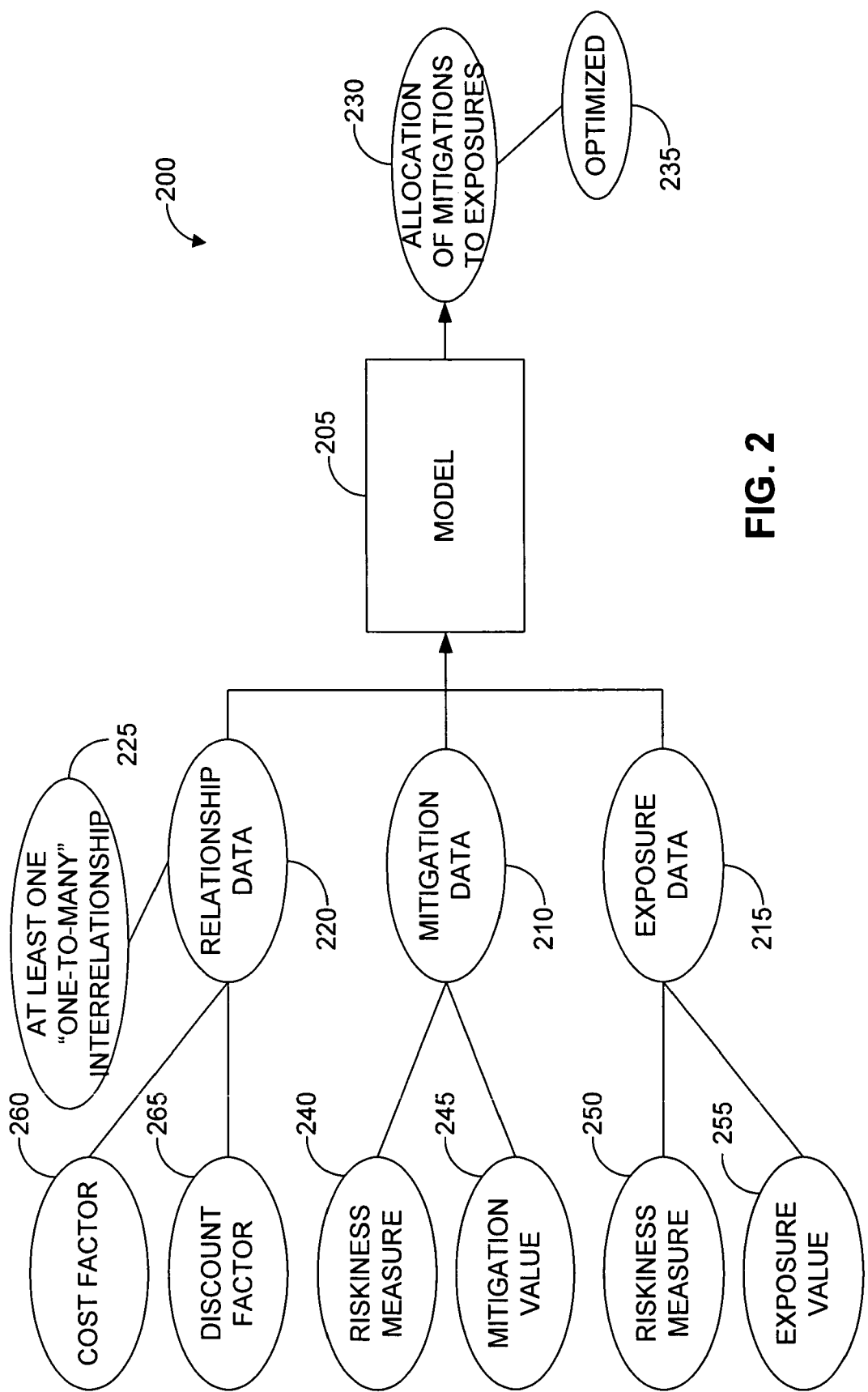

FIG. 2 shows another example of a financial risk optimization system 200. The model 205 accepts mitigation data 210, exposure data 215 and relationship data 220, which can be retrieved from a database. The model 205 produces an allocation 230 of the mitigation data 210 to the exposure data 215. The allocation 230 represent an optimized allocation 235 based on the results of a linear programming algorithm used by the model 205.

It should be noted that the mitigation data 210 in this example includes mitigation riskiness measures 240 as well as mitigation values 245 associated with the mitigations described by the mitigation data 210. A mitigation value 245 may generally describe the portion of an exposure value associated with the exposure that is covered by the mitigation, while a mitigation riskiness measure 240 describes the risk associated with a particular mitigation. Exposure data can also include exposure riskiness measures 250 as well as exposure values 255 associated with the exposures described by the exposure data 215. An exposure value 255 can generally describe the size of the exposure, while an exposure riskiness measure 250 describes the risk associated with the exposure.

Relationship data 220 can include or induce a cost factor 260 and a discount factor 265 associated with the relationships between mitigations and exposures. A cost factor 260 may generally describe the cost of applying a mitigation to an exposure, and can be a function of the riskiness measures of the mitigations and exposures. A discount factor 265 can include situations where the exposure and mitigation are in different currencies, or constitute a maturity mismatch between related exposures and mitigations, or any over-collateralization that may be implicated by regulation(s).

As an illustration of the different types of data that can be used, consider the example where a building secures a loan. In such an example, the building is the mitigation, while the loan is the exposure. The balance of the loan could be $1,000,000, while the appraised price of the building could be $800,000. Thus, the exposure value associated with the exposure in this example is $1,000,000, and the mitigation value associated with the mitigation in this example is $800,000. Thus, the unsecured portion of the loan is $200,000. According to banking regulations, a financial institution should carry regulatory capital of $200,000 adjusted by some risk weight associated with the exposure, as well as $800,000 adjusted by some risk weight associated with the mitigation. The risk-weighted assets associated with the mitigation may further be adjusted by the cost factor and/or discount factor as described above.

Figure 3:
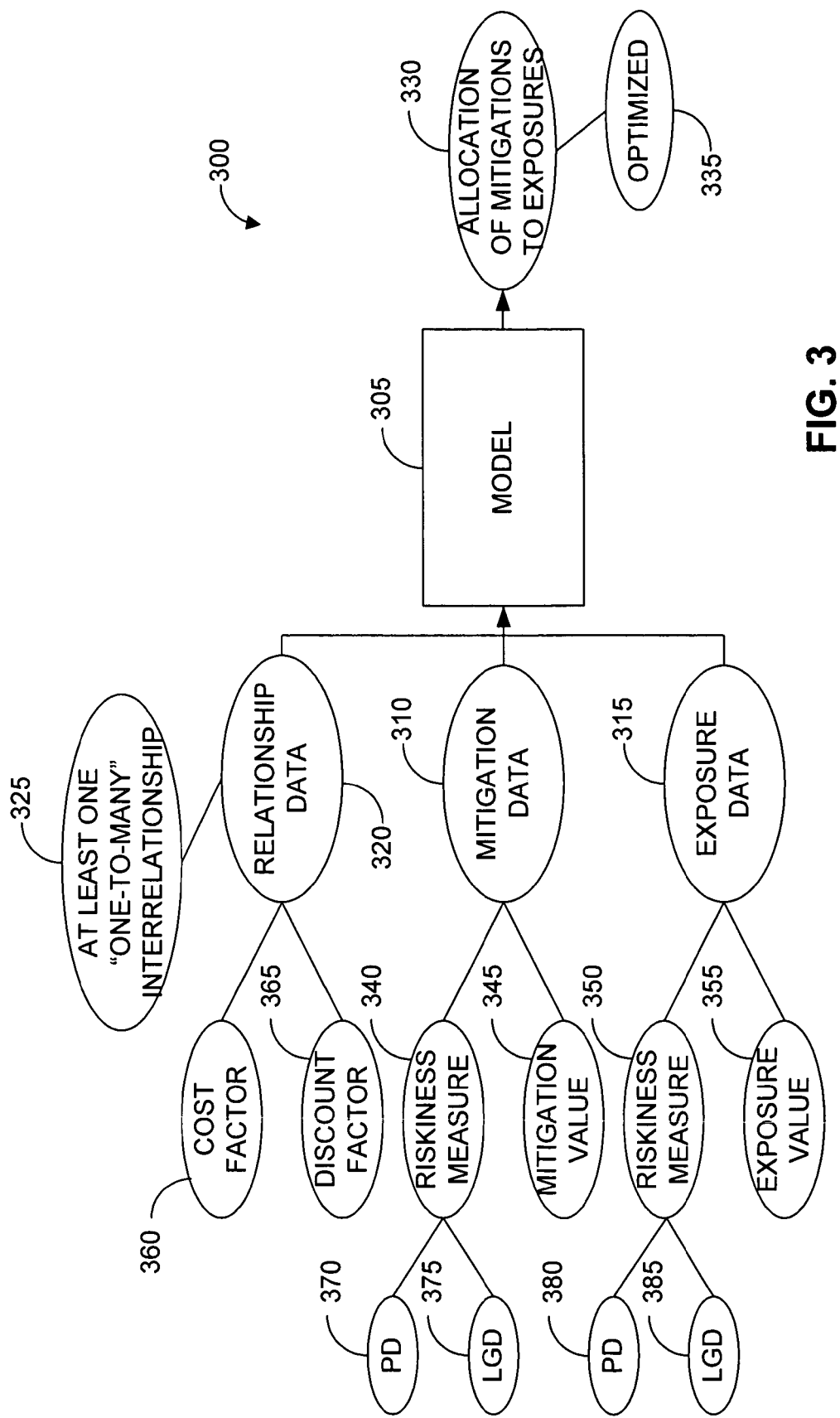

FIG. 3 depicts a further example of a financial risk optimization system 300. The financial risk optimization model 305 receives mitigation data 310, exposure data 315, and relationship data 320. The data 310, 315, 320 in this example have been determined based on agreements entered into by a financial institution. The relationship data is characterized by having one or more "one-to-many" relationships between exposures and mitigations described by the exposure data 315 and mitigation data 310 respectively. A generalized network is created based upon the input data.

Further, the mitigation riskiness measure 340 can include, for example, data regarding a probability of default 370 and a loss given default 375, among others, to identify the mitigation riskiness measure of a mitigation. Similarly, the exposure riskiness measure 350 can also include data regarding a probability of default 380 and a loss given default 375 to identify the exposure riskiness measure of an exposure. The financial risk optimization model 305 can compute an allocation 330 using the data provided.

Figure 4:
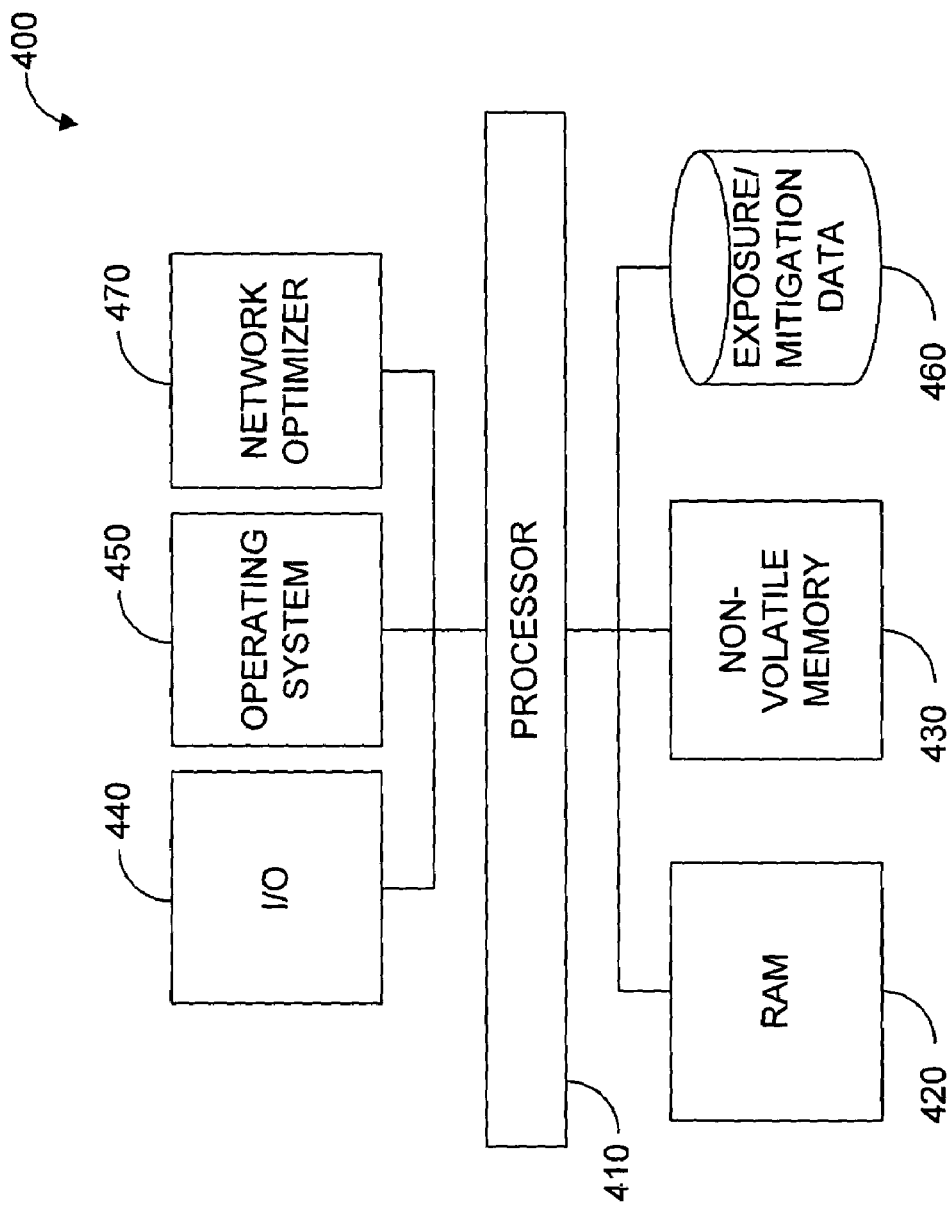
FIG. 4 is a block diagram of a computer system having access to data for use in financial risk mitigation.

FIG. 4 depicts a block diagram of a computing device 400 that can execute a financial risk optimization model of the present disclosure. The computing device 400 includes a processor 410 which is configured to execute instructions stored in memory, such as a random access memory (RAM) 420. The instructions can be transferred to the RAM 420 from the non-volatile memory 430 in preparation for execution. It should be understood that the non-volatile memory 430 can further contain other non-instruction data. The processor can communicate with a user, or other program via any supported input/output interfaces. Examples of such I/O interfaces can include a monitor, a keyboard, a mouse, and a communication interface to communicate with other computers, among many others. An operating system (O/S) executing on the processor can help to facilitate operation of the computer and execution of any applications residing on the computer system 400. It should be recognized that each of these components of the computing system are readily available in myriad different combinations, and this disclosure is intended to apply equally to all current and future computing systems.

The computing system 400 further includes a connection to exposure, mitigation and relationship data stored on a data store 460. Myriad suitable data stores are commercially available from a variety of vendors. It should be noted that the data store 460 can be co-located with the computing system 400 or remotely located from the computing system 400. The data store 460 can include mitigation and exposure information about the agreements entered into on behalf of the financial institution. This information includes relationship information that links the mitigation data to the exposure data.

The computing system 400 also includes a network optimizer 470. The network optimizer can include one or more linear programming algorithms, configured to find optimal solutions to network problems. One such network optimizer 470 is SAS/OR™ 9, commercially available from SAS Institute of Cary, N.C. The SAS/OR™ 9 package can use both a simplex and/or an interior point algorithm to solve the network problems in an effort to achieve optimal allocation of mitigations to exposures. However, it should be understood that the present disclosure is not limited to the SAS/OR™ 9 software package. Instead the disclosure is intended to include all software packages that are operable to take a generalized network and solve for an optimal solution. It should also be understood that different linear programming instructions can produce different optimal results. For example, an optimal solution could be a solution produced by a particular algorithm, an extension to an algorithm, or combinations of algorithms and/or extensions to the algorithm(s).

Figure 5:
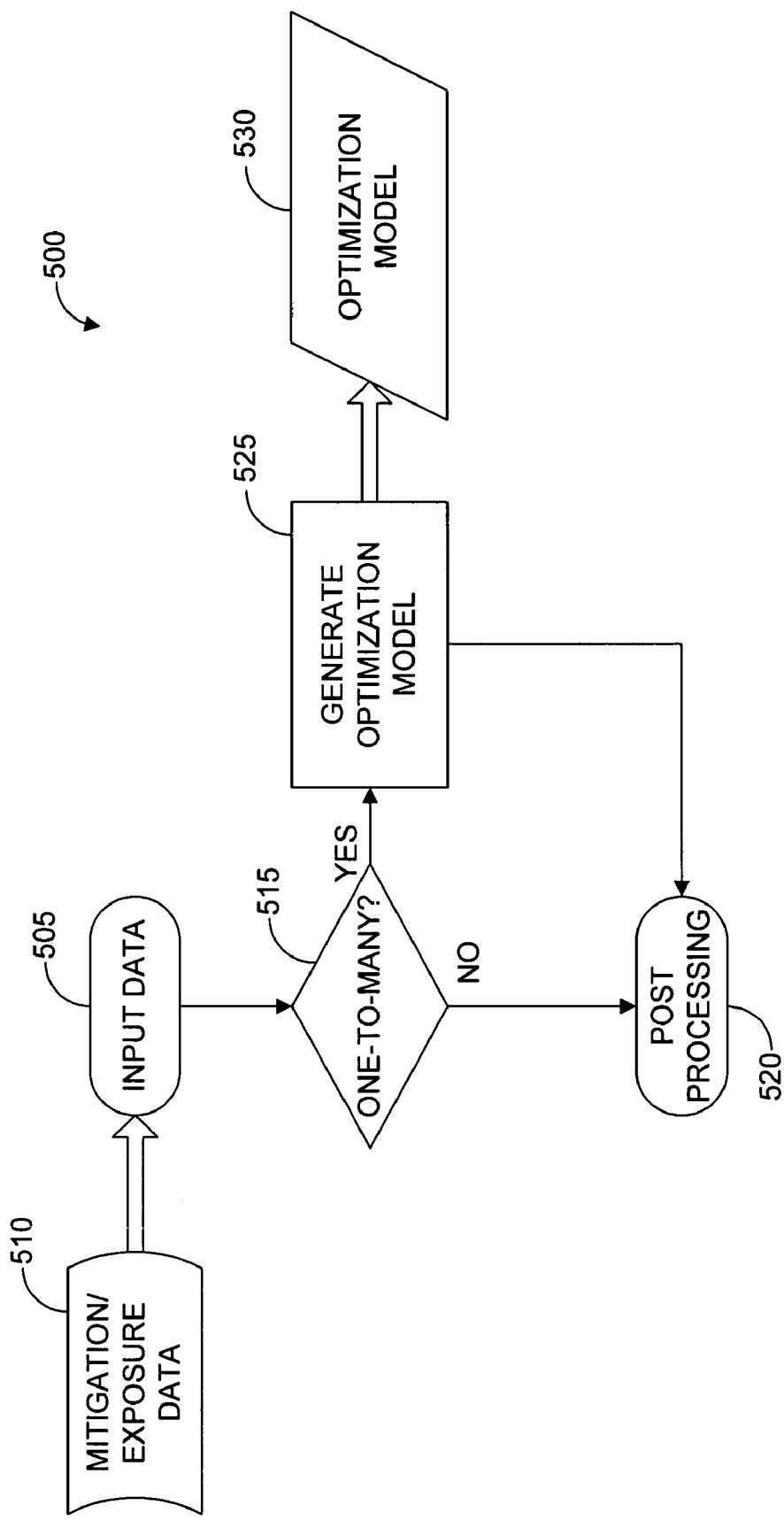
FIGS. 5 and 6 are flowcharts depicting example operational scenarios of financial risk mitigation optimizations.

FIG. 5 is a flowchart depicting an operational scenario 500 for financial risk mitigation optimization. The operational scenario begins by receiving mitigation, exposure and relationship data 510 at step 505. The data 510 is then examined to determine whether it contains a "one-to-many" relationship, as shown by decision block 515. If the data does not include a "one-to-many" relationship, there can be only one way in this example to apply the mitigation(s) to the exposure(s), and the operational scenario performs post processing at terminal block 520.

However, if there are one or more one-to-many relationships between the mitigations and the exposures as determined by decision block 515, the operational scenario continues by generating a financial risk mitigation optimization model 530 at process block 525. The financial risk optimization model 530 can then be used to generate many different types of results, represented by post processing block 520, such as, for example, results to help a user determine an amount of regulatory capital the user should have in order to comply with industry regulations.

It should be understood that similar to the other processing flows described herein, the steps and the order of the steps in the flowchart described herein may be altered, modified and/or augmented and still achieve the desired outcome. For example, FIG. 6 depicts another operational scenario 600 for financial risk mitigation optimization.

Figure 6:
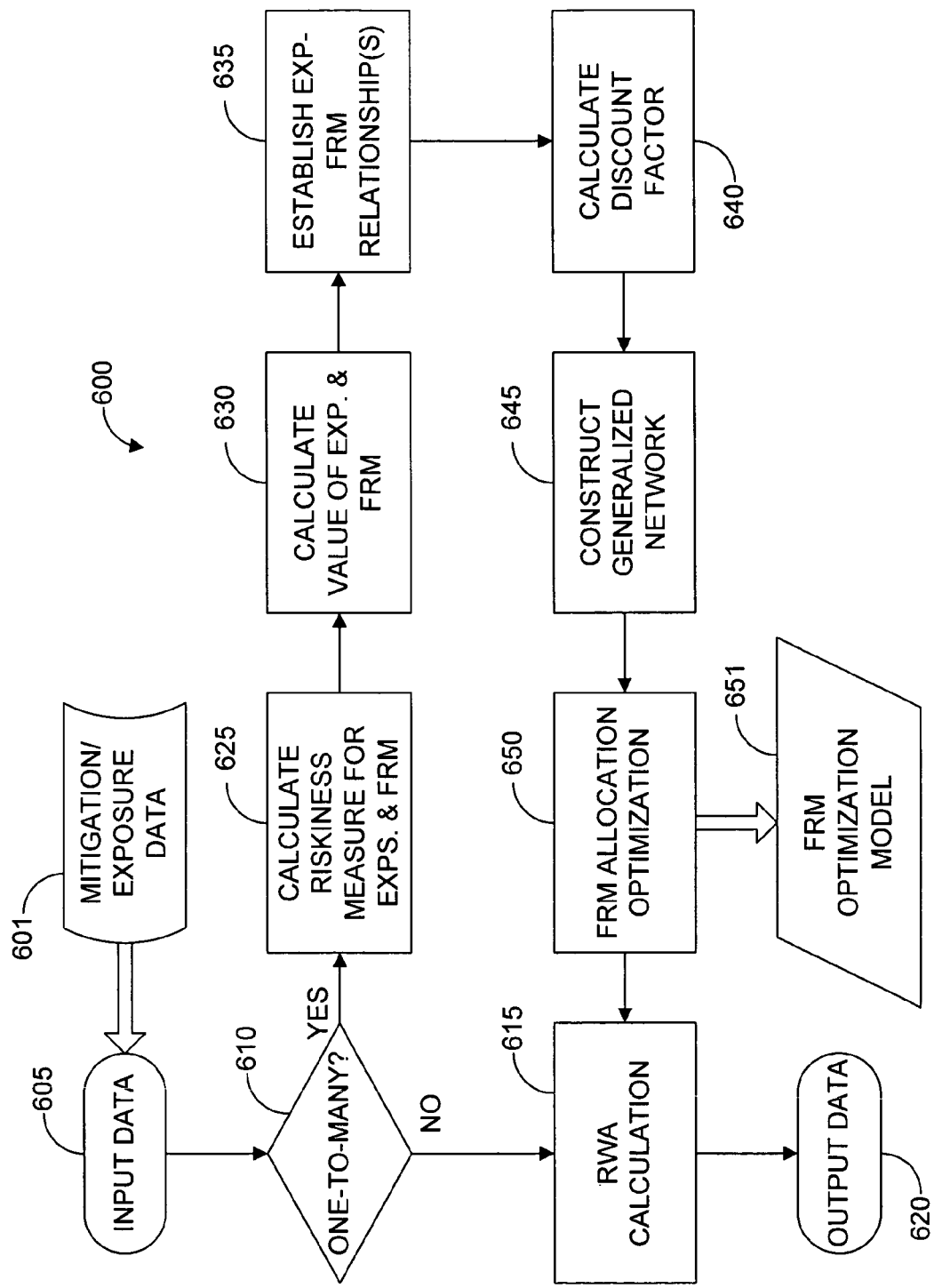

With reference to FIG. 6, the system receives mitigation, exposure and relationship data 601 from a data store at block 605. The data 601 is then examined to determine whether it contains a one-to-many relationship, as shown by decision block 610. If the data does not include a "one-to-many" relationship, there can be only one way in this example to apply the mitigation(s) to the exposure(s). A risk-weighted assets analysis is then performed at process block 615. After performing the risk-weighted assets analysis, the process outputs the risk-weighted assets analysis and ends at terminal block 620.

With reference back to decision block 610, if there is a one-to-many relationship between exposure(s) and mitigation(s), the system can calculate riskiness measures for the exposure(s) and mitigation(s) at process block 625. The value of the exposure(s) and mitigation(s) is computed at process block 630. The relationships between the exposure(s) and mitigation(s) are established at process block 635. At process block 640, any discount factors for the exposures and mitigations are calculated. The system can then construct a generalized network model at process block 645. The generalized network model is then used as input into the financial risk mitigation allocation optimization process block 650. The financial risk mitigation allocation optimization process block produces a financial risk mitigation model optimization model 651. At process block 615, the system uses the financial risk mitigation optimization model to perform a risk-weighted asset analysis of the model. The system then outputs the result of the risk-weighted assets analysis.

As described above, financial exposures can be offset by financial risk mitigations such as, for example, collateral, guarantees, netting, credit derivatives, and insurance, among others.

One example of such a regulation is the "International Convergence of Capital Measurement and Capital Standards", known as Basel II (2004), which states that, for example: financial exposures are to be risk weighted according to their financial qualities; if an eligible financial risk mitigation is present with an exposure, then the risk weight of the financial risk mitigation can be used as the risk weight of the portion of the exposure that is covered by the financial risk mitigation; the applicable value of the financial risk mitigation can be adjusted according to the nature of the mitigation. Thus, a financial risk system as disclosed herein that calculates the regulatory capital requirement can handle the above requirement for a large number of exposures and financial risk mitigations.

Regulatory capital, can be summarized as the computation of the aggregated risk weighted assets:

$$RWA = \sum_{i=1}^{n} EAR_i RW_i, \quad (1)$$

where RWA stands for risk-weighted-assets, EAR stands for exposure-at-risk and RW is the risk eight. The total number of exposures is n. When financial risk mitigations are present with an exposure, the exposure can be decomposed into an unsecured portion and several secured portions that take the adjusted value of the financial risk mitigation. The secured portions take the risk weights that are correspondent to the mitigations. The unsecured portion takes the risk weight of the exposure itself. The risk weight asset in equation (1) can now be written as $$RWA = \sum_{i=1}^{n} \left( \left( \sum_{j_i=1}^{m_i} SEC_{j_i} RW_{j_i} \right) + USEC_i RW_i \right) \quad (2)$$

where SEC is the secured portion and USEC is the unsecured portion. Exposures in some instances can be secured by several financial risk mitigations. Similarly, mitigations in some instances can secure several exposures.

Without considering adjustments to the value of the financial risk mitigations, the equation (2) can formulate a minimum cost network flow problem.

To adjust for the potential changes in the material value of the financial risk mitigations, additional adjustments can be made based upon the nature of the mitigations. For example, Basel II (2004) implicates haircut discounts to financial collaterals and nettings. In addition, if the exposure and financial risk mitigations are in different currencies, further haircut discounts can be made to account for the fluctuation of the foreign exchange rate dynamics. Since the discount may depend on both the exposures and the financial risk mitigations, it is are dependent.

Using the generalized network model, discounts can also be added to the arc to represent the attrition in the goods. In the above example the discounts are represented by multipliers $M_{ji}$. Let $CV_{ji}$ be the value of the financial risk mitigation that secures the exposure i. The secured portion $SEC_{ji}$ in equation (2) can be written as the multiplication of the value of the financial risk mitigation that secures the exposure and the appropriate multiplier for this pair of exposure and mitigation. Equation (3) reflects the risk weighted function in this case.

$$RWA = \sum_{i=1}^{n} \left( \left( \sum_{j_i=1}^{m_i} CV_{j_i} M_{j_i} RW_{j_i} \right) + USEC_i RW_i \right) \quad (3)$$

The minimum cost generalized network minimizes the equation (3) given the exposure-mitigation relation constraints. The generalized network can be represented in a network framework by adding transition nodes as well. Transition nodes can operate as another layer of nodes between the exposure and mitigations and can handle, for example, the discounting function, as an alternative to using the directed arc to handle the discounting function. A generalized network is then solved by a model having access to a linear programming algorithm in order to optimize the financial risk mitigation situation.

Figure 7:
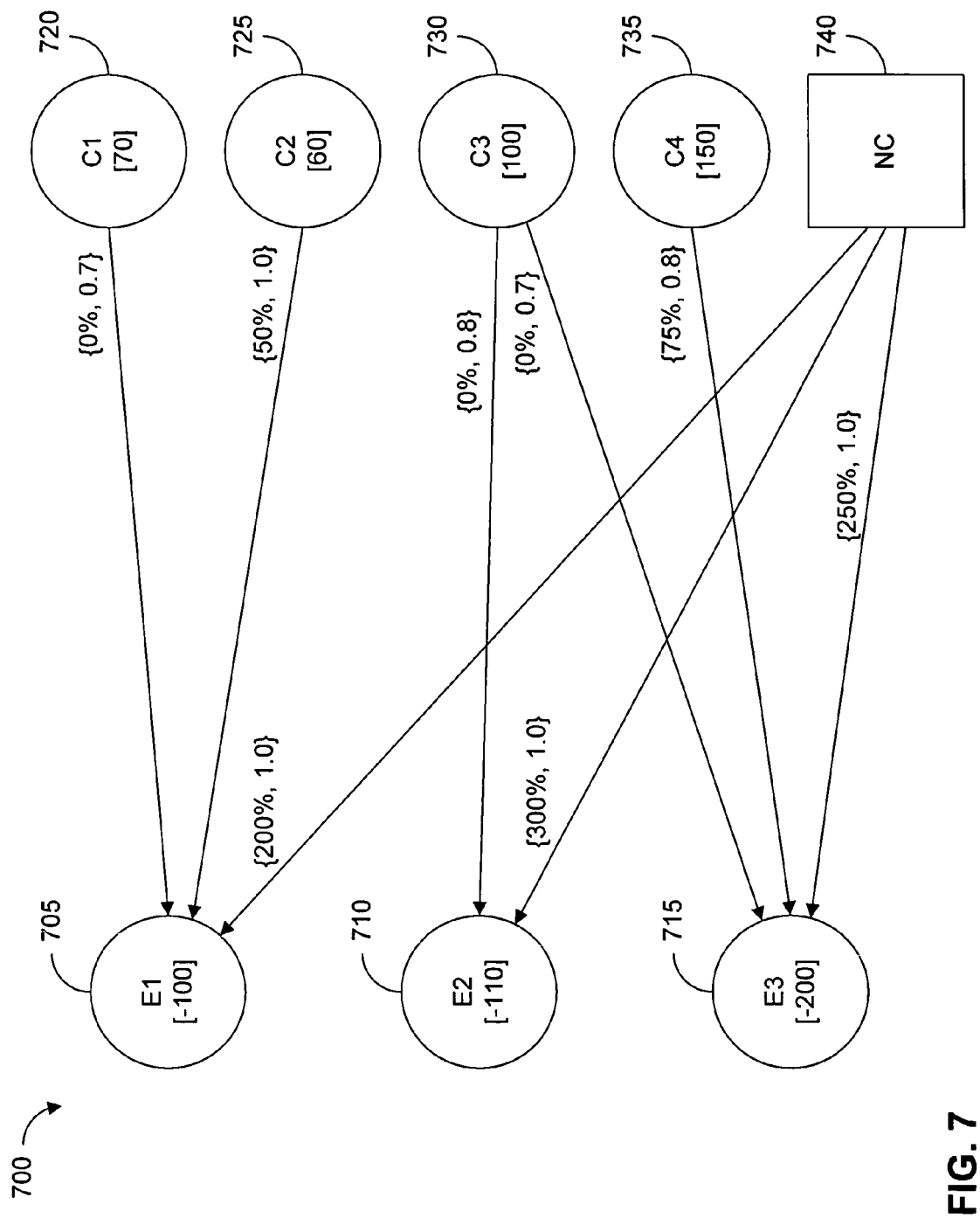
FIG. 7 is a block diagram which depicts an example of financial exposures and mitigations along with relationships between the exposures and the mitigations.

FIG. 7 provides a visualization depiction of an example generalized network model problem that can be solved using financial risk mitigation optimization techniques disclosed herein. In this example, a node is an entity in the network and could be suppliers, demanders or transition; an arc is the path from one entity to another; a directed network is a network that has only directed arcs; and arc cost is the cost associated with an arc when goods are moved from one end of the arc to the other.

The generalized network model can be automatically constructed by a computer program that has access to the mitigation, exposure and relationship data. The data could be accessed from any number of data stores, such as data structures, database tables, data files, etc. Data about the mitigations can be used to generate supply nodes, while data about the exposures can be used to generate to demand nodes. Data about the relationships between the exposures and mitigations can be used to generate directed arcs, and the cost of applying a mitigation to an exposure can be assigned to an arc's cost.

In FIG. 7 there are three exposures E1 705, E2 710, and E3 715 and four financial risk mitigations C1 720, C2 725, C3 730, and C4 735. The node NC 740 supplies the unsecured portions of the exposures in the diagram so as to balance the network. The financial risk mitigations act as supply nodes and exposures as demand nodes. The flow costs are the risk weights associated with the mitigations. The arcs indicate possible links between financial risk mitigations and exposures based upon the financial institution's agreements. In the case of the example in FIG. 7, exposure E1 705 is secured by C1 720 and C2 725, E2 710 is secured by C3 730, and E3 715 is secured by C3 730 and C4 735. Amounts flowing out of the NC node take the risk weight of the correspondent exposure. The first number on each arc (exposure-mitigation relation) indicates the cost (risk weight) associated with the arc. (In addition to the nodes shown in the graph, a "sink" node acting as a dummy exposure could be used in some situations, such that it is connected with all the supply nodes in order to drain any extra supply away from the arcs so that the flows on the arcs are balanced.)

Additional data for this example is as follows:
1. E1 705 has an exposure at default (EAD) of $100 and is risk weighted 200%. E2 710 has an EAD of $110 and is risk weighted 300%. E3 715 has an EAD of $200 and is risk weighted 250%.
2. C1 720 and C3 730 are financial collaterals, C2 725 is a guarantee, and C4 735 is a receivable collateral. C1 720 is worth $70. C2 725 is worth $60 and is risk weighted 50%. C3 730 is worth $100. C4 735 is worth $150 and is risk weighted 75%.
3. The directed arc in FIG. 7 represents the possible coverage between the financial risk mitigations and exposures. These are usually specified by the business contracts and can be altered.

Financial collaterals can be subject to haircut adjustments (based on collateral itself and also currency mismatch adjustment if necessary). For this problem, the haircut adjustments can be assumed to be multipliers (E1, C1)=0.7, (E2, C3)=0.8, (E3, C3)=0.7. The guarantee has no adjustment, so the multiplier on (E1, C2)=1. The receivable is subject to an over-collateralization adjustment, which results in the multiplier (E3, C4)=0.8.

Regulations indicate that the risk weighted asset should be calculated in accordance with equation (3). In addition the bank also needs to report the risk weight for the secured and unsecured portion of each exposure. In the example of FIG. 7, there are quite a few ways that the bank could apply the financial risk mitigations to the exposures.

1. For E1, there are two possible ways to apply the mitigations:
   a. Apply C1 first and C2 second:
      The secured portion by C1 is $49 with 0% risk weight and the secured portion by C2 is $51 with 50% risk weight. The RWA for E1 is 51*50%+49*0%=25.5.
   b. Apply C2 first and C1 second:
      The secured portion by C2 is $60 with risk weight 50% and the secured portion by C1 is $40 with 0% risk weight. The RWA for E1 is 60*50%+40*0%=30.
2. E2 and E3 share C3 but E4 has sole claim to C4. There are two ways to apply the mitigations:
   a. E2 is secured by C3 and E3 secured by C4:
      The secured portion of E2 by C3 is $80 with 0% risk weight, and unsecured portion is $30 with 300% risk weight. The RWA for E2 is 80*0%+30*300%=90.
      The secured portion of E3 by C4 is $120 with 75% risk weight and unsecured portion is $80 with 250% risk weight. The RWA for E3 is 120*75%+80*250%=290.
      The total RWA for E2 and E3 in this case is 380.
   b. E3 is secured by C3 and C4. E2 is completely unsecured.
      The secured portion of E3 by C3 is $70 with risk weight 0% and the secured portion of E3 by C4 is $120 with risk weight 75%. The unsecured portion is $10 with risk weight 250%. The RWA for E3 is 70*0%+120*75%+10*250%=185. The RWA for E2 is 110*300%=330. The total RWA for E2 and E3 is 515.

Overall there are four possible ways to allocate the financial risk mitigation in this small example (1(a)-2(a); 1(a)-2(b); 1(b)-2(a); 1(b)-2(b)). A model is constructed and determines that the optimal solution to this example is the 1(a)-2(a) combination, where the total RWA is 405.5 (25.5+380=405). The worst case is the 1(b)-2(b) combination where the total RWA is 545 (30+515=545). Using this disclosure a financial institution can find a best case scenario for a large portfolio of exposures and mitigations. For example, a financial institution's portfolio could include on the order of millions of exposures and mitigations, which can implicate a vast number of possible solutions.

While examples have been used to disclose the invention, including the best mode, and also to enable any person skilled in the art to make and use the invention, the patentable scope of the invention is defined by claims, and may include other examples that occur to those skilled in the art. For example, financial institutions may have millions of exposures and financial risk mitigations, each worth hundreds of thousands of dollars. Thus, the differences in the RWA due to mitigation allocations can be drastic. A financial risk optimization model can be configured as disclosed herein to efficiently solve this problem and can report the secured and unsecured portion directly from the optimization result.

A financial risk mitigation optimization solution could also be configured to include: efficient solution for large number of exposures and financial risk mitigations that are typical to most banks; execution of relations according to the contractual rules; optimal allocation of mitigations; generalized results that separate the portions of the exposure that are covered by different financial risk mitigations as indicated by the some regulations; calculations of the capital requirements and optimal allocations through the generalized minimum cost network are conveniently implemented by existing linear programming network optimization models; the solution to the optimization can help financial institutions determine priority between the exposures and financial risk mitigations thereby lowering the financial institution's regulatory capital.

It is further noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented one many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented method for mitigating financial risk, comprising:
   receiving, by at least one processor, data indicative of exposures, data indicative of financial risk mitigations, and data indicative of relationships between financial risk mitigation and exposures, the received relationship data including a one-to-many relationship between a financial risk mitigation and an exposure;
   constructing, by the at least one processor, a generalized network model, by applying one or more financial risk mitigations to one or more exposures wherein the step of constructing comprises:
   calculating an exposure value associated with each of the exposures and a mitigation value associated with each of the financial risk mitigations,
   determining whether there is a one-to-many relationship between one or more of the exposures and one or more of the financial risk mitigations based upon the relationship data received,
   when a one-to-many relationship is determined, calculating an exposure riskiness measure associated with each of the one or more exposures having a one-to-many relationship and a mitigation riskiness measure associated with each of the one or more financial risk mitigations having a one-to-many relationship,
   comparing each of the exposure values and exposure riskiness measures associated with the exposures to each of the mitigation values and mitigation riskiness measures associated with the financial risk mitigations, and
   determining, as an output of the generalized network model, what portion of each of the exposures can be offset by each of the financial risk mitigations based upon the comparison;
   producing, by the at least one processor, one or more allocations of the mitigations to the exposures by applying, a first linear programming algorithm to the output of the generalized network model; and
   performing, by the at least one processor, an analysis of each of the mitigation values, by applying a financial risk mitigation optimization model to the one or more allocations of the mitigations to the exposures and determining which of the one or more allocations of the mitigations to the exposures is an optimal solution.

2. The method of claim 1, wherein the financial risk mitigation optimization model maximizes the use of financial risk mitigations risk mitigated to a minimal level; and wherein the financial risk mitigation optimization model is solved based upon the exposure, financial risk mitigation, and relationship data.

3. The method of claim 2, wherein the financial risk mitigation optimization model includes a second linear programming algorithm for use in determining an optimal allocation of the financial risk mitigations with respect to the exposures.

4. The method of claim 3, wherein the second linear programming algorithm is at least one of an interior point algorithm, or a simplex algorithm, including any combinations thereof.

5. The method of claim 1, wherein financial risk mitigation is credit risk mitigation.

6. The method of claim 1, wherein the mitigation riskiness measure for each of the one or more financial risk mitigations and the exposure riskiness measure for each of the one or more exposures is determined based upon probability of default and loss given default associated with the financial risk mitigations and exposures.

7. The method of claim 1, wherein the data indicative of the relationships between financial risk mitigations and exposures is generated based upon agreements which specify how financial risk mitigations are associated with exposures.

8. The method of claim 7, wherein the relationships between the exposures and financial risk mitigations are established by at least one of a collateral agreement, an insurance agreement, a credit derivative, a guarantee, or a netting agreement.

9. The method of claim 7, further comprising:
calculating, by the at least one processor, a discount factor between related exposures and financial risk mitigations;
wherein the discount factor is calculated based upon maturity mismatches between the exposures and financial risk mitigations, currency mismatches between the exposures and financial risk mitigations, or an over-collateralization requirement, and combinations thereof.

10. The method of claim 9, further comprising:
calculating, by the at least one processor, a cost of using a financial risk mitigation to cover an exposure based upon the mitigation riskiness measure of the financial risk mitigation and the exposure riskiness measure of the exposure.

11. The method of claim 1, further comprising:
linking, by the at least one processor, the data indicative of exposures to the data indicative of financial risk mitigations, and
associating, by the at least one processor, a cost and a discount factor with each of the linkings of the generalized network.

12. The method of claim 1, wherein the financial risk optimization model is configured to notify a user of a minimum asset value level adequate to cover risk-weighted financial risk mitigations and any risk-weighted unsecured exposures.

13. The method of claim 12, wherein performing the analysis of risk weighted assets comprises:
adjusting each of the financial risk mitigations by:
multiplying each of the financial risk mitigations by associated financial risk mitigation discounts based upon the relationships between one or more of the financial risk mitigations and one or more of the exposures,
multiplying each of the financial risk mitigations by associated financial risk mitigation riskiness measures;
adjusting any uncovered portions of each of the exposures by multiplying risk-weighted unsecured exposures by associated exposure riskiness measures; and
adding the adjusted financial risk mitigations associated with an exposure to the adjusted risk-weighted financial risk portions of the exposures.

14. The method of claim 13, wherein the analysis of risk-weighted assets for the exposures alerts a user to a level of regulatory capital projected to cover risk-weighted unsecured exposures and risk-weighted financial risk mitigations.

15. The method of claim 14, wherein the risk weighted assets analysis of the financial risk mitigation optimization model is created based upon financial regulations.

16. The method of claim 1, wherein the one-to-many relationship comprises at least one of: a relationship between an exposure and a plurality of financial risk mitigations, a relationship between a financial risk mitigation and a plurality of exposures, and a relationship between a plurality of financial risk mitigations and a plurality of exposures.

17. A computer-implemented system configured to generate a financial risk mitigation optimization model including an allocation of financial risk mitigations to exposures, comprising:
memory; and
at least one processor linked to the memory and configured to:
receive data indicative of exposures, data indicative of financial risk mitigations, and data indicative of relationships between financial risk mitigations and exposures, wherein the received relationship data includes a one-to-many relationship between a financial risk mitigation and an exposure;
construct a generalized network model, by applying one or more financial risk mitigations to one or more exposures, wherein constructing includes:
calculating an exposure value associated with each of the exposures and a mitigation value associated with each of the financial risk mitigations;
determining whether there is a one-to-many relationship between one or more of the exposures and one or more of the financial risk mitigations based on the relationship data received;
when a one-to many relationship is determined, calculating an exposure riskiness measure associated with each of the one or more exposures having a one-to-many relationship and a mitigation riskiness measure associated with each of the one or more financial risk mitigations having a one-to-many relationship;
comparing each of the exposure values and exposure riskiness measures associated with the exposures to each of the mitigation values and mitigation riskiness measures associated with the financial risk mitigations; and
determining, as an output of the generalized network model, what portion of each of the exposures can be offset by each of the financial risk mitigations based on the comparison;
produce one or more allocations of the mitigations to the exposures by applying a first linear programming algorithm to the output of the generalized network model; and
perform an analysis of each of the mitigation values, by applying a financial risk mitigation optimization model to the one or more allocations of the mitigations to the exposures, and determine which of the one or more allocations of the mitigations to the exposures is an optimal solution.

18. The method of claim 1, wherein producing an allocation includes matching a mitigation associated with multiple exposures to one or more of the associated exposures.

19. The method of claim 1, wherein producing an allocation includes matching an exposure associated with multiple mitigations to one or more of the associated mitigations.

* * * * *

UNITED STATES PATENT AND TRADEMARK OFFICE
CERTIFICATE OF CORRECTION

PATENT NO. : 7,624,054 B2 Page 1 of 1
APPLICATION NO. : 11/211353
DATED : November 24, 2009
INVENTOR(S) : Chen et al.

It is certified that error appears in the above-identified patent and that said Letters Patent is hereby corrected as shown below:

In column 10, line 56, after the word "and" insert a paragraph.

Signed and Sealed this

Sixth Day of April, 2010

David J. Kappos
*Director of the United States Patent and Trademark Office*